No. 766,317. PATENTED AUG. 2, 1904.
G. B. BASSETT.
WATER METER.
APPLICATION FILED DEC. 17, 1903.
NO MODEL.

Witnesses
Chas. M. Harrington
James A. Magoffin

Inventor
George B. Bassett

No. 766,317. Patented August 2, 1904.

UNITED STATES PATENT OFFICE.

GEORGE B. BASSETT, OF BUFFALO, NEW YORK.

WATER-METER.

SPECIFICATION forming part of Letters Patent No. 766,317, dated August 2, 1904.

Application filed December 17, 1903. Serial No. 185,506. (No model.)

*To all whom it may concern:*

Be it known that I, GEORGE B. BASSETT, a citizen of the United States, residing at Buffalo, in the county of Erie and State of New York, have invented a new and useful Water-Meter, of which the following is a specification, reference being had to the drawings accompanying and forming a part thereof.

This invention relates to improvements in water-meters of a type in which the velocity of a current of water through the meter is measured by its tangential action on a paddle-wheel.

The objects of my present invention are principally to improve the construction and arrangement of the outside casing, bearings, and other parts in the construction of these meters for the purpose of reducing the cost of manufacture, allowing the more ready assemblage, separation, and adjustment of parts, increasing the efficiency and durability, and giving other advantageous results.

I will now proceed to definitely describe the manner in which I have carried out my invention and then claim what I believe to be novel.

Figure 1:
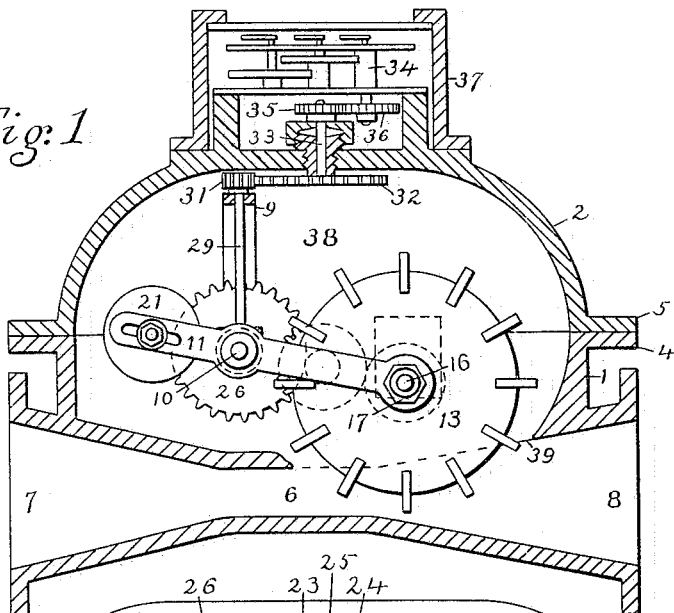
Figure 2:
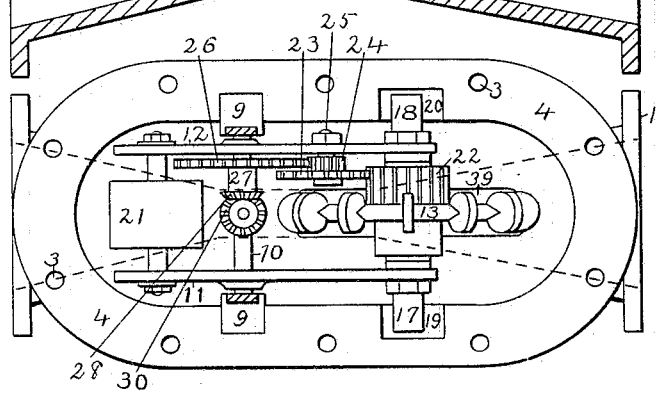
Figure 3:
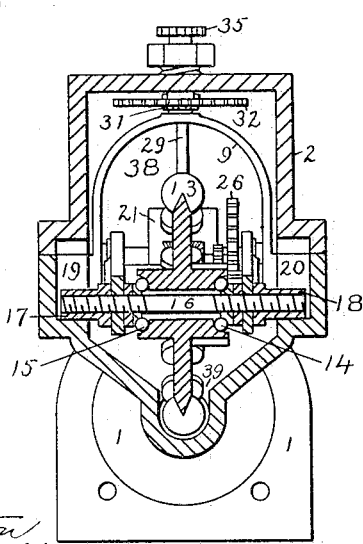

In the drawings, Figure 1 is a central vertical longitudinal section of the outer case of my improved meter, showing the interior working parts in place. Fig. 2 is a horizontal downward view of same with the top of outer case removed. Fig. 3 is a vertical cross-section of same, taken through the center of the paddle-wheel and with the indicator removed.

The outer casing is composed of two detachable parts 1 and 2, which may be fastened together by bolts passing through holes 3 in their meeting flanges 4 and 5. Lower outer casing 1 is provided with a current-way 6, having a gradually-contracting inlet 7 and a gradually-expanding outlet 8. In the outer casing is supported the stationary gear-frame 9, having the horizontal stationary shaft 10, on which the two teetering-levers 11 and 12 are loosely mounted. The paddle-wheel 13 is mounted on one end of levers 11 and 12 by means of ball-bearings 14 and 15 and shaft 16. The nuts 17 and 18 on ends of shaft 16 extend into the vertically-elongated slots 19 and 20, formed in the outer casing of the meter, and thus limit the arc of movement in levers 11 and 12 and prevent paddle-wheel 13 touching the casing at either its highest or lowest position.

21 is a counterbalance-weight adjustably mounted on the other end of levers 11 and 12. Firmly attached to paddle-wheel 13, so as to revolve with it, is toothed pinion-wheel 22, meshing into toothed gear-wheel 23, which is firmly attached to toothed pinion-wheel 24, loosely mounted, so as to revolve with it on stud 25, which is rigidly fastened to lever 12. Pinion 24 meshes into toothed gear-wheel 26, which is firmly attached to sleeve 27, having bevel toothed wheel 28 firmly attached to it. Sleeve 27 is loosely mounted and revolves on horizontal shaft 10. Vertical pinion-shaft 29 is supported by a lower bearing on shaft 10 and by an upper bearing on frame 9. On the lower end of shaft 29 is firmly attached the toothed bevel-wheel 30, meshing with bevel-wheel 28, and on the upper end toothed pinion-wheel 31, meshing with toothed gear-wheel 32, which is firmly mounted on stuffing-box shaft 33.

34 is an indicator which is operated from stuffing-box shaft 33 by means of the toothed change-gear wheels 35 and 36.

37 is the indicator-case, which protects indicator 34 from injury.

38 is a water-chamber containing the submerged moving mechanism of the meter and communicates with current-way 6 through the slot 39. The paddle-wheel 13 also projects into current-way 6 through slot 39 from water-chamber 38 in which it is supported.

When the meter is properly assembled, the counterweight 21 is permanently adjusted and fastened, so that paddle-wheel 13 slightly overbalances it and rests at its lowest point, but does not quite touch the bottom of current-way 6, because the nuts 17 and 18 rest against the bottom of recesses 19 and 20.

A current of water passing through the meter will act on paddle-wheel 13 and cause it to revolve in the same way as a toothed rack might act on a toothed wheel. The speed of the paddle-wheel 13 will correspond to the speed of the water through current-way 6, which motion is duly transmitted through the series of toothed wheels via toothed wheel 26 to the indicator. While the current of water is slow the paddle-wheel will receive its full force, which is desirable in order to have its circumference revolve as nearly as possible at the same speed as the current of water; but should the current of water increase its speed the paddle-wheel will be automatically raised by it and will run along on top of the current, which would then be more in the nature of a solid jet, thus relieving the paddle-wheel from undue strain and shock at heavy flows and also permitting sticks, stones, and dirt to pass through the meter without materially interfering with its working.

To more clearly show my principal improvements, I will enumerate them as follows:

My first improvement consists in forming a current-way which gradually contracts as it approaches the paddle-wheel and gradually expands as it leaves it. The maximum force of the water is thus concentrated on the paddle-wheel with a minimum back pressure.

My second improvement consists of a paddle-wheel that is automatically adjustable relative to the current of water passing through the meter, so as to receive the full force of the current at slow flows and proportionately less force of the current as the flow increases.

My third improvement consists of means for adjusting the amount of overbalance or resistance of the paddle-wheel to being raised by the current, which may be done by moving the counterweight 21 nearer or farther from shaft 10.

My fourth improvement consists in providing the paddle wheel with ball-bearings which renders it more sensitive at slow flows and less liable to wear at fast flows.

My fifth improvement consists of intermediate gearing so arranged as to transmit the motion of the paddle-wheel to the indicator during all the automatic changes in position of the paddle-wheel relative to the current of water and the indicator.

My sixth improvement consists of limiting the distance through which the paddle-wheel is automatically raised and lowered, so it cannot come in contact or rub against the case of the meter.

My seventh improvement consists in placing the meeting flanges of the outside case in a plane parallel to the axis of the paddle-wheel for convenience in assembling and inspecting the working parts of the meter.

My eighth improvement consists of a current-way with a gradually-contracting inlet and a gradually-expanding outlet and an adjacent water-chamber containing the mechanism of the meter and communicating with the waterway through an opening in the wall between them.

My ninth improvement consists in mounting the entire submerged moving mechanism of the meter except the stuffing-box gear 32 on the skeleton frame 9 and shaft 10, so that it can be assembled complete and rotated and inspected before being placed in the outer casing.

Having thus described my invention, what I claim, and desire to secure by Letters Patent, is—

1. In a water-meter, the combination with a paddle-wheel and a separate outer surrounding casing in which said wheel is mounted, of an adjacent continuous tangential current-way the area of which gradually contracts as it approaches said paddle-wheel and gradually expands as it leaves it, substantially as and for the purpose described.

2. In a water-meter, the combination with a current-way and adjacent outer casing, of a submerged paddle-wheel in said casing and means of mounting said wheel so as to project into said current-way a distance varying inversely in proportion to the speed of the water through said current-way, substantially as and for the purpose described.

3. In a water-meter, the combination with a current-way, and a submerged paddle-wheel and means of mounting same so that it automatically rises as the flow through the current-way increases, of an adjustable counterweight that regulates the amount of resistance of the paddle-wheel to being raised, substantially as and for the purpose described.

4. In a water-meter, the combination with an indicator, a submerged paddle-wheel adjustable along the arc of a circle and an outer surrounding case, of an intermediate toothed wheel revolving on the center of said circle and through which the motion of said paddle-wheel is transmitted to said indicator, substantially as and for the purpose described.

5. In a water-meter, the combination with an outside case, a seat in said case, and a paddle-wheel adjustably mounted in said case, of a projection formed on the movable supports of said paddle-wheel adapted to contact with said seat in said case and preventing said paddle-wheel rubbing against said case, substantially as and for the purpose described.

6. In a water-meter the combination with an outer surrounding casing and an indicator of a submerged paddle-wheel supported on a teetering-lever in said casing, substantially as and for the purpose described.

7. In a water-meter, the combination with a single separate continuous tangential current-way having a gradually-contracting inlet area and a gradually-expanding outlet area, and an adjacent submerged chamber containing a paddle-wheel, of an opening in the wall between said current-way and said chamber through which the blades of said paddle-wheel may project into said current-way, substantially as and for the purpose described.

8. In a water-meter the combination with an inclosed current-way and a paddle-wheel operated by a current in said way of means for automatically adjusting the amount of contact of said wheel with said current inversely in proportion to the speed of said current.

9. In a water-meter the combination with an indicator, an outside case, a paddle-wheel in said case operating said indicator, of means for automatically adjusting the amount of contact of said wheel, with the current of water passing through said meter, inversely in proportion to the speed of said current.

In witness whereof I have hereunto set my signature this 15th day of December, 1903.

GEORGE B. BASSETT.

Witnesses:
    JAMES A. MAGOFFIN,
    RAY T. ROMER.